United States Patent [19]

Chen

[11] 4,382,978

[45] May 10, 1983

[54] METHOD OF LASER ENHANCED THERMAL DIFFUSION

[75] Inventor: Bor-Uei Chen, Northridge, Calif.

[73] Assignee: Hughes Aircraft Company, Culver City, Calif.

[21] Appl. No.: 212,180

[22] Filed: Nov. 24, 1980

Related U.S. Application Data

[62] Division of Ser. No. 938,562, Aug. 31, 1978, abandoned.

[51] Int. Cl.³ .................. B05D 3/06; C02B 5/172
[52] U.S. Cl. .................. 427/53.1; 427/162; 427/163; 427/164
[58] Field of Search .................. 427/53.1, 163, 162, 427/164

[56] References Cited

U.S. PATENT DOCUMENTS 4,284,663 8/1981 Carruthers et al. ............ 427/163 X

*Primary Examiner*—James R. Hoffman
*Attorney, Agent, or Firm*—Allen A. Dicke, Jr.; William J. Bethurum; Anthony W. Karambelas

[57] ABSTRACT

There is disclosed a method by which a three-dimensional horn structure at the end of a channel waveguide in a dielectric chip is produced to facilitate coupling of a fiber optic waveguide by butt coupling techniques. The three-dimensional horn structure is fabricated by localized surface diffusion resulting from superposing a $CO_2$ laser heating beam on the desired enlarged area while diffusion of the waveguide is taking place or after it has taken place in a controlled ambient furnace atmosphere.

12 Claims, 8 Drawing Figures

METHOD OF LASER ENHANCED THERMAL DIFFUSION

This is a division of application Ser. No. 938,562, filed Aug. 31, 1978, now abandoned.

BACKGROUND OF THE INVENTION

The present invention solves a critical problem in optical communication systems. The channel waveguide horn structures formed in accordance with the present invention not only improve the coupling efficiency between the channel waveguide and a single mode optical fiber by a significant amount, but also reduce the tolerance requirements for the coupling between such single mode optical fibers and channel waveguides. The present invention makes end-butt coupling techniques feasible for field operation.

The coupling between single-mode optical fiber and channel waveguides is a critical aspect of the realization of many circuits. Of all the coupling schemes proposed in the literature, end-butt coupling is the most straightforward and practical, particularly when low index glass fiber (N=1.5) is to be coupled to high index LiNbO$_3$ channel waveguide (N=2.20). High coupling efficiency is expected when the mode intensity profile of the two waveguides are properly matched and when the optical fiber is aligned precisely to the channel waveguide. The Fresnel reflection loss at waveguide termination can be reduced by adding a bit of index matching epoxy or anti-reflection coating at the waveguide ends. Usually, the single-mode channel waveguides used in optical circuits require shallow waveguide depths to obtain a large interaction between the guided optical field and surface accoustic or electric field. The typical cross-section of a Ti-diffused LiNbO$_3$ channel waveguide is about 4 by 2 micrometers; however, single-mode optical fibers have relatively larger core diamenters, ranging from 5 to 15 micrometers. To assure a good mode matching in optical field, one can use either a small core fiber or the three-dimensional horn structure of the present invention at the end of the channel waveguide. Using small-core fibers in an optical system is not practical because of a severe coupling tolerance requirement. In contrast, the combination of the present three-dimensional horn structure and a relatively large core fiber will make the tolerance less critical.

In order to aid in the understanding of this invention, it can be stated in essentially summary form that it is directed to a method for for producing enhanced diffusion so that an optical waveguide may have varying cross-sections along its length.

It is therefore an object of the present invention to provide a method to produce a three-dimensional horn structure at the end of a channel waveguide which is suitable for butt coupling to a single mode fiber optic.

It is a further object of the invention to provide a method for fabricating such a three-dimensional horn structure.

These and other objects, features and advantages of the invention will be apparent to those skilled in the art from the more detailed description below taken in conjunction with the accompanying drawings wherein like reference characters refer to like parts throughout.

DETAILED DESCRIPTION OF THE INVENTION

An important area of optical communication is the coupling between optical fibers (signal transmission medium) and integrated optical circuits (signal processors). A potentially important coupling configuration consists of single mode optical fibers and electro-optical channel waveguide modulators/switchers. Since multimode optical fibers are not suitable for the transmission of high speed signal over long distance, the employment of single mode optical fibers becomes necessary. Electro-optical channel waveguides are very attractive for the fabrication of active integrated optical circuits because of the capability of electrical control and high speed operation. A number of 4-legs electro-optical channel guide devices have been demonstrated in Ti-diffused LiNbO$_3$ and LiTaO$_3$.

End-butt coupling is a straightforward and, in fact, a practical approach for the coupling between single mode optical fibers and channel waveguides. In this technique, an optical fiber with a cleved end is butt against the channel waveguide. High coupling efficiency is expected when the mode intensity profiles of the two waveguides are properly matched and the fiber is precisely aligned to the channel waveguide. Single mode channel waveguides have rather small cross-sections, typically, 4×2 micrometers. To assure a good mode matching, we are forced to use either a small core size fiber or to provide an enlarged horn structure at the end of the channel waveguide. However, the smaller the core diameter of the fiber, the more critical the alignment tolerance requirements. A lateral displacement of one core radius would result in more than 3 dB additional coupling loss.

Figure 4:
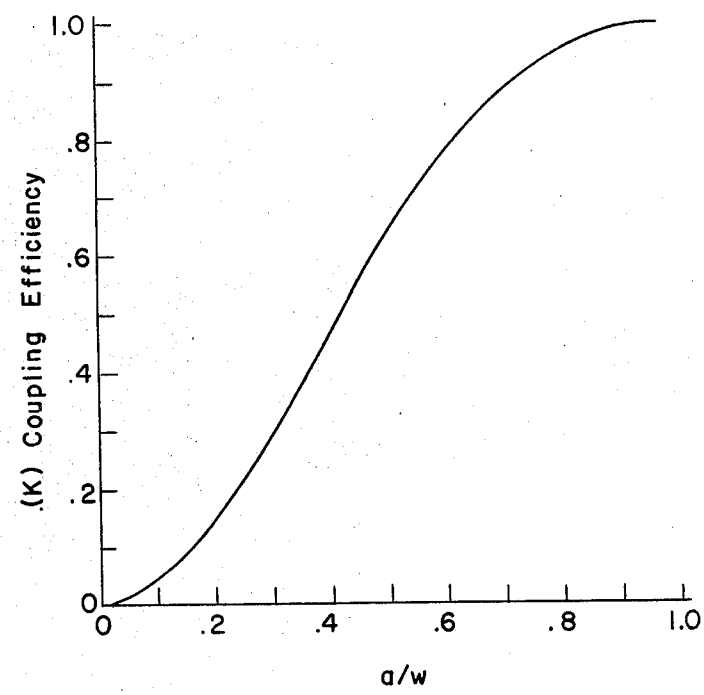
FIG. 4 is a graph showing coupling efficiency in butt coupling as a function of the ratio of mode radii.

The improvement in the coupling efficiency and tolerance requirements as a result of forming the three-dimensional horn structure in the end of the channel waveguide is quite apparent. In an end-butt coupling configuration, the coupling efficency is determined by the overlap integral between the transverse optical field in the fiber and in the channel waveguide. Assuming that the mode intensity profiles in the optical fiber and the channel waveguide both have Gaussian beam characteristics, the field coupling efficiency between these two aligned Gaussian beams is given by:

$$K = \frac{4}{\left(\frac{w}{a} + \frac{a}{w}\right)^2}$$

where w and a are the beam spot size (measured at $e^{-2}$ intensity points) at the end faces of the fiber and the channel waveguide, respectively. The formula is derived for a zero separation between fiber and channel waveguide. FIG. 4 is a plot of K as a function of a/w, the ratio of mode radii. When a/w is increased from 0.4 to 0.8, the coupling efficiency is increased by a factor of 2. The optical intensity distribution in a single-mode fiber can be approximated by a Gaussian fiunction with less than 1% error.

Figure 1:
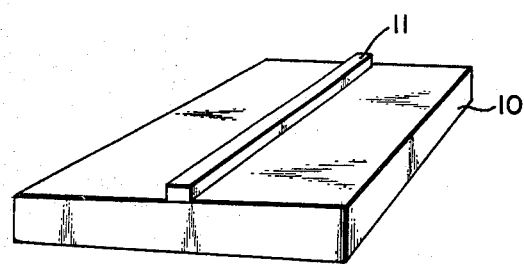
FIG. 1 is a perspective view of the starting materials for formation of a channel waveguide.
Figure 2:
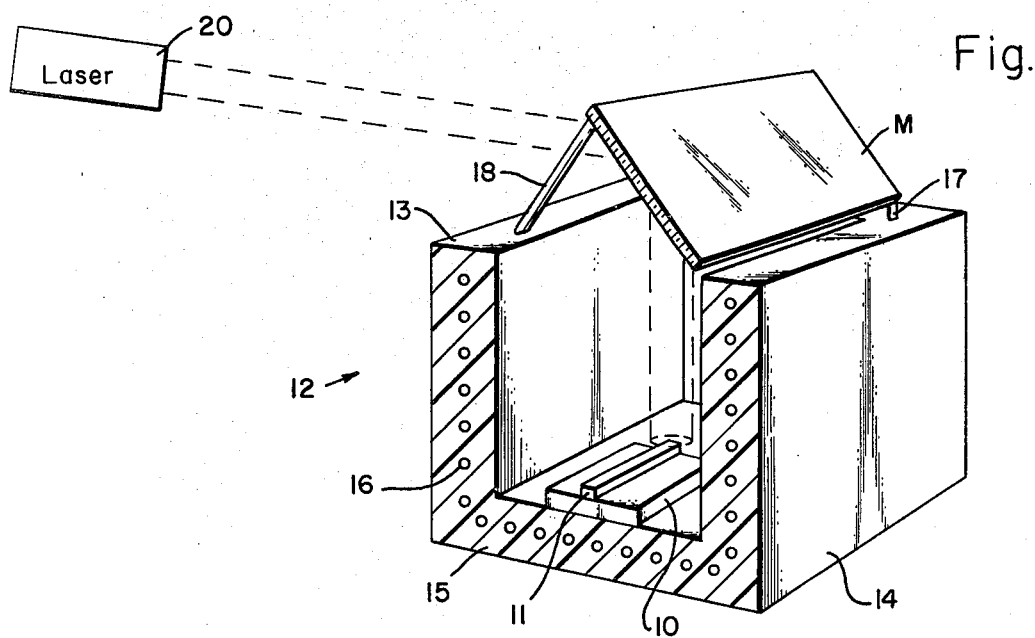
FIG. 2 is a sectional view, partially schematic, of apparatus for manufacturing the device of the present invention from the starting materials of FIG. 1.

The present invention describes a novel technique of forming a three-dimensional horn structure at the end of a channel waveguide to improve the mode matching as well as to reduce critical tolerance requirements. As seen in FIG. 1, a substrate 10 of lithium niobate ($LiNbO_3$) has positioned on it a strip 11 of titanium (Ti). The titanium which is to be diffused into the substrate to form a straight channel waveguide of uniform cross-section may (in a preferred embodiment) suitably have dimensions of approximately 4 micrometers wide and 200 angstroms thick. This substrate-strip assembly is placed in an oven 12 which may suitably have insulated side walls 13 and 14 and an insulated bottom 15 each containing a plurality of heating coils 16. The oven 12 is shown in FIG. 2 in broken away sectional view to illustrate this relationship. The oven is also provided with a top mounted mirror M which may be supported on the walls of the oven above its open top in any suitable manner as by posts or brackets 17 and 18. The mirror is at an angle of approximately 45 degrees to the plane of the open top of the oven so that a beam 21 of radiant energy from a laser 20 may be reflected from the under surface of the mirror M to a predetermined position at the bottom of the oven which will be occupied by the area of the channel waveguide to be formed into a three-dimensional horn.

There are two possible processes for forming the three-dimensional horn structure. In the first approach, a straight channel waveguide of uniform cross-section is first formed by thermal diffusion in the oven without the use of the laser and thereafter the laser beam is applied to broaden one end of the channel into the horn structure. In the second approach, the two diffusion steps may take place simultaneously, that is to say, the formation of the straight channel waveguide and the formation of the horn structure may occur by simultaneous diffusions. In either case, the resulting product is generally of the configuration shown in FIG. 3 wherein substrate 10 has diffused into it the straight channel waveguide 11a which terminates in the horn structure 11b at the end which has been exposed to the laser radiation.

In a first effort at making an actual device using the first process, a straight channel waveguide of uniform cross-section was formed by thermal diffusion of titanium metal into the lithium niobate substrate. The diffusion was carried out at high temperature (approximately 950 degrees centigrade) and a flowing oxygen atmosphere for 16 hours. After this diffusion, the $CO_2$ laser 20 was turned on and was focussed at the end of the channel waveguide material 11 on substrate 10 in the oven. The laser was of 2 watts continuous wave power. The surface temperature of the lithium niobate substrate 10 is raised locally around the laser heating area. In order to avoid thermal cracking due to a large thermal differential, the whole sample was maintained at 700 degrees centigrade by leaving it in oven 12 which is provided with conventional thermostatic controls (not shown). The thermal diffusion at this lower temperature is negligable. Only at the laser heated area which reaches the temperature of approximately 950 degrees centigrade, is the diffusion continued. This continued diffusion forms the horn shaped waveguide 11b at the end of the straight uniform width waveguide 11a. The resulting horn structure dependes on the laser spot size, the lithium niobate thermal conductivity, the temperature dependence of the titanium diffusivity, laser power, ambient temperature and diffusion time. Experimentally, it has been observed that an increase of 50% in diffusion depth occurs after 6 hours of laser heating.

In the second approach wherein both diffusions occur simultaneously, it has been found that an oven diffusion time of 5 hours at an oven temperature of 750 degrees (or in the range of 650 degrees centigrade to 850 degrees centigrade) is sufficient and that throughout this time, the laser beam from the $CO_2$ laser 20 should be applied to the end 11b of the channel wavegude. The laser power may be in the range of 1.2 to 3 watts with the 2.0 watt figure given above being preferred. The local temperature at the point at which the laser beam is focussed will be raised by 100 degrees centigrade to 250 degrees centigrade above the ambient temperature.

In either process a laser spot size of approximately 500 microns diameter is preferred where the waveguide starting material 11 is titanium having a width of 4 microns and a thickness of 200 angstrom units.

In principle, the formation of a horn-like structure is determined by several parameters, such as laser spot size, absorption coefficient of lithium niobate at 10.6 micrometers, thermal conductivity, temperature dependence of the titanium diffusion coefficient, and diffusion time. The mathematical theory of diffusion in an isotropic medium is based on the hypothesis that the rate of transfer of the diffusion substance through a unit area of a section is proportional to the concentration gradient in the direction normal to the section. The resulting mathematical treatment is quite complex and in fact has not been useful in developing the device. Empirical experimental results have been relied upon.

Figure 3:
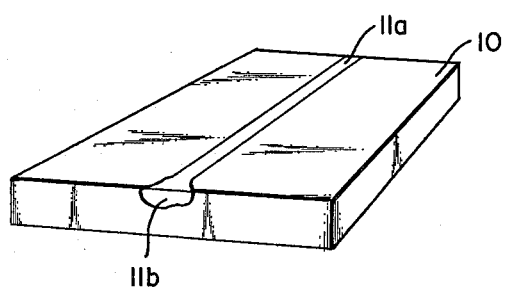
FIG. 3 is a prespective view of the device of FIG. 1 after diffusion by the apparatus of FIG. 2.

It will of course be understood that the shape of the horn structure of 11b shown in FIG. 3 is functionally schematic only and does not give an accurate representation of the physical structure detail of the resulting diffusion.

Figure 5A:
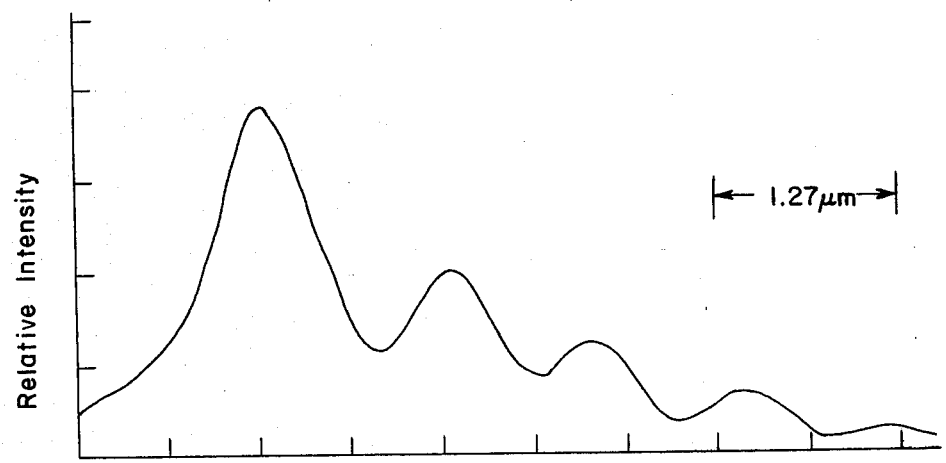
FIGS. 5a and 5b are respectively graphs showing relative intensity along the depth direction for (a) expanded and (b) unexpanded channel waveguides respectively.
Figure 5B:
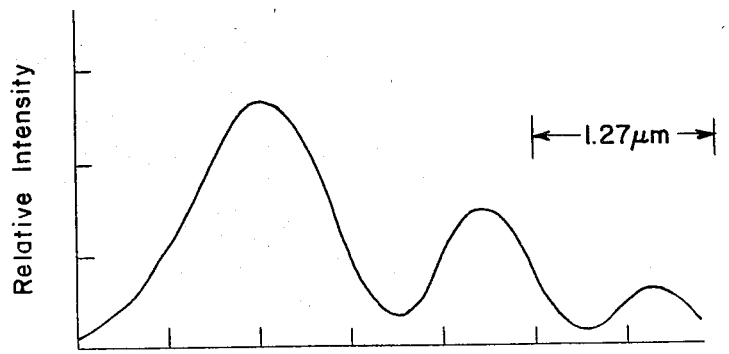
Figure 6A:
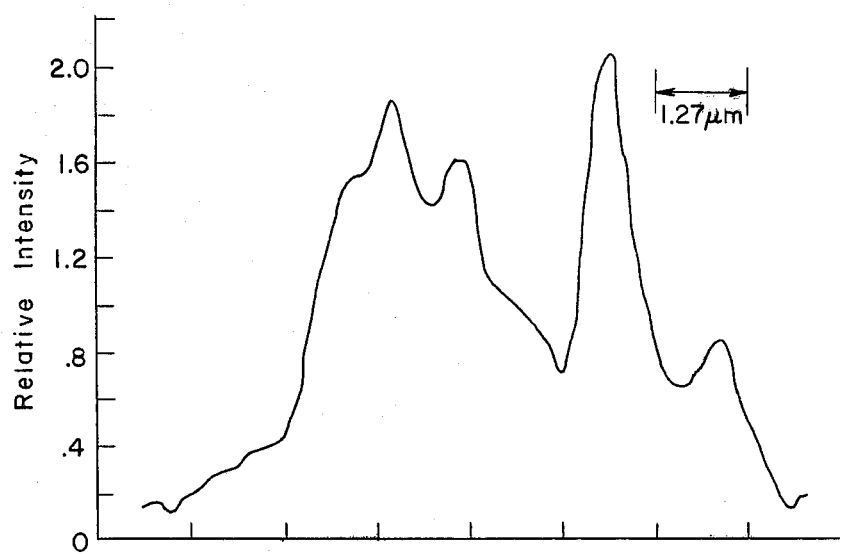
FIGS. 6a and 6b are graphs showing a plot of relative intensity as a function of distance along the channel width direction for (a) expanded and (b) unexpanded channel waveguides.
Figure 6B:
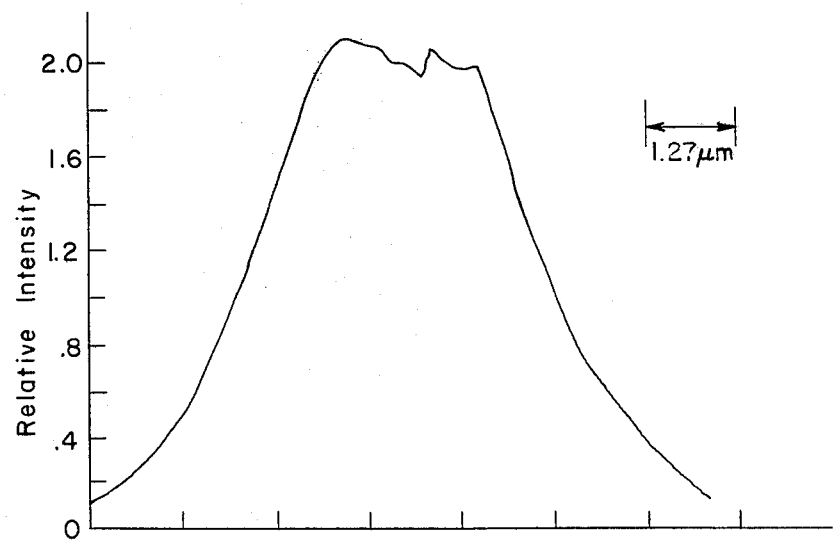

Rather, attention is directed to FIGS. 5a, 5b, 6a, and 6b which are graphs showing the near-field intensity scans along the depth and width directions of the diffused channel waveguide. These curves are determined experimentally by measuring the relative intensity of light transmitted through the optical waveguide as measured across the respective dimensions of the horn structure at the output end. FIG. 5a represent an intensity scan along the depth direction for the expanded waveguide of the type shown in FIG. 3 by contrast with FIG. 5b which represents the relative intensity distribution along a conventional uniform, straight or unexpanded otherwise similar channel guide. FIGS. 6a and 6b show a similar comparison along the width direction from left to right across the substrate. That is to say, FIGS. 6a and 6b are intensity scans along the channel width direction for (a) expanded and (b) unexpanded channel waveguides respectively. It is not known why the intensity distribution oscillates in the depth direction. It is apparent from the measurements represented in FIGS. 5 and 6 that the fabrication techniques used does provide a widening of the waveguide optically transmissive area at the output end which has been exposed to the laser radiation.

What is claimed is:

1. A process for forming a channel optical waveguide having a three demensional structure therein comprising the steps of:
    thermally diffusing an optical waveguide into a substrate to form a channel waveguide which is substantially uniform in cross-section throughout a substantial portion of its length; and
    raising a selected portion of the channel waveguide to a temperature where further diffusion will take place so that a diffused structure of larger cross section than the substantially uniform channel waveguide is formed at the selected location.

2. The process of claim 1 wherein the heating of the portion of the waveguide selected for the structure of larger cross-sections is performed simultaneously with the heating of the substantially uniform channel waveguide for forming the channel diffused waveguide.

3. The process of claim 2 wherein the step of heating the selected portion for the structure of larger cross-section is accomplished by directing a continuous wave laser on to the selected portion.

4. The process of claim 1 wherein the heating of the selected portion is performed subsequently to the heating which causes the thermal diffusion of the substantially uniform channel waveguide.

5. The process of claim 4 wherein the step of heating the selected portion for the structure of larger cross-section is accomplished by directing a continuous wave laser onto the selected portion.

6. The process for forming a channel optical waveguide having a three dimensional structure therein comprising the steps of:
    thermally diffusing an optical waveguide into a substrate to form a channel waveguide of substantially uniform cross-section through most of its length; and
    directing a continuous wave laser onto a selected portion of the channel waveguide to raise the selected portion of the channel waveguide to a temperature where further diffusion takes place at the selected portion of the channel waveguide so that the channel waveguide has a larger cross-section at the selected portion of the channel than the substantially uniform channel waveguide away from the selected location.

7. The process of claim 6 wherein the heating of the portion of the waveguide selected for the structure of larger cross-section is performed simultaneously with the heating of the substantially uniform channel waveguide for forming the channel diffused waveguide.

8. The process of claim 6 wherein the laser heating of the selected portion is performed subsequently to the thermal diffusion of the substantially uniform channel waveguide.

9. A process for forming a channel optical waveguide wherein the waveguide depth and width are independently controlled comprising the steps of:
    thermally diffusing an optical waveguide into a substrate to form a channel waveguide;
    additionally heating a selected portion of the channel waveguide to a temperature where further diffusion takes place to form a horn structure portion of optical waveguide to greater depth than the substantially uniform channel waveguide formed away from the selected location.

10. The process of claim 9 wherein the additional heating of the portion of the waveguide selected for the structure of greater depth is performed simultaneously with the thermal diffusion of the substantially uniform channel waveguide for forming the channel diffused waveguide.

11. The process of claim 9 wherein the step of additionally heating the selected portion for the horn structure is accomplished by directing a continuous wave laser onto the selected portion.

12. The process of claim 9 wherein the additional heating of the selected portion is performed subsequently to the thermal diffusion heating of the substantially uniform channel waveguide.

* * * * *